United States Patent
Bouvier et al.

(10) Patent No.: US 8,924,132 B2
(45) Date of Patent: Dec. 30, 2014

(54) METHOD FOR MONITORING THE ENABLING OF A SYSTEM

(75) Inventors: Damien Bouvier, Stuttgart (DE); Tobias Pfister, Stuttgart (DE); Joerg Linke, Dresden (DE); Frank Kluever, Freiberg A.N. (DE)

(73) Assignee: Robert Bosch GmbH, Stuttgart (DE)

( * ) Notice: Subject to any disclaimer, the term of this patent is extended or adjusted under 35 U.S.C. 154(b) by 338 days.

(21) Appl. No.: 13/351,425

(22) Filed: Jan. 17, 2012

(65) Prior Publication Data

US 2012/0191320 A1    Jul. 26, 2012

(51) Int. Cl.
| | |
|---|---|
| *F02D 41/22* | (2006.01) |
| *F01N 11/00* | (2006.01) |
| *F02D 41/14* | (2006.01) |
| *F01N 3/02* | (2006.01) |
| *F01N 9/00* | (2006.01) |

(52) U.S. Cl.
CPC .......... *F01N 11/002* (2013.01); *F02D 41/1466* (2013.01); *Y02T 10/40* (2013.01); *F01N 3/0205* (2013.01); *F01N 2900/1602* (2013.01); *F01N 2550/05* (2013.01); *F01N 9/005* (2013.01); *Y02T 10/47* (2013.01); *F01N 2900/0422* (2013.01); *F01N 2900/0421* (2013.01); *F02D 41/22* (2013.01); *F01N 2900/08* (2013.01)

USPC ............ 701/107; 701/113; 123/685; 123/690

(58) Field of Classification Search
CPC ... F02D 41/22; F02D 41/1466; F01N 11/002; F01N 9/005
USPC ......... 123/672, 673, 676, 685, 688, 690, 697; 701/113, 102, 107; 73/114.69, 114.75
See application file for complete search history.

(56) References Cited

U.S. PATENT DOCUMENTS

| | | | | |
|---|---|---|---|---|
| 4,502,443 | A  * | 3/1985  | Hasegawa et al. | ............ 123/686 |
| 5,647,206 | A  * | 7/1997  | Yamamoto et al. | ............. 60/297 |
| 6,539,707 | B2 * | 4/2003  | Ikemoto et al. | .................. 60/285 |
| 6,792,346 | B2 * | 9/2004  | Takebayashi et al. | ........ 701/113 |
| 6,980,904 | B2 * | 12/2005 | Gosho et al. | .................. 701/113 |

\* cited by examiner

*Primary Examiner* — Hai Huynh
(74) *Attorney, Agent, or Firm* — Michael Best & Friedrich LLP

(57) ABSTRACT

A method for monitoring the enabling of a system which is assigned to an internal combustion engine, in which the readiness for operation of the system is dependent on an operating temperature, is characterized in that a fault in the enabling of the system is inferred (106) if operation of the system cannot be detected on expiry of a predeterminable time period after the starting of the internal combustion engine or on the recurrence of readiness for operation.

11 Claims, 3 Drawing Sheets

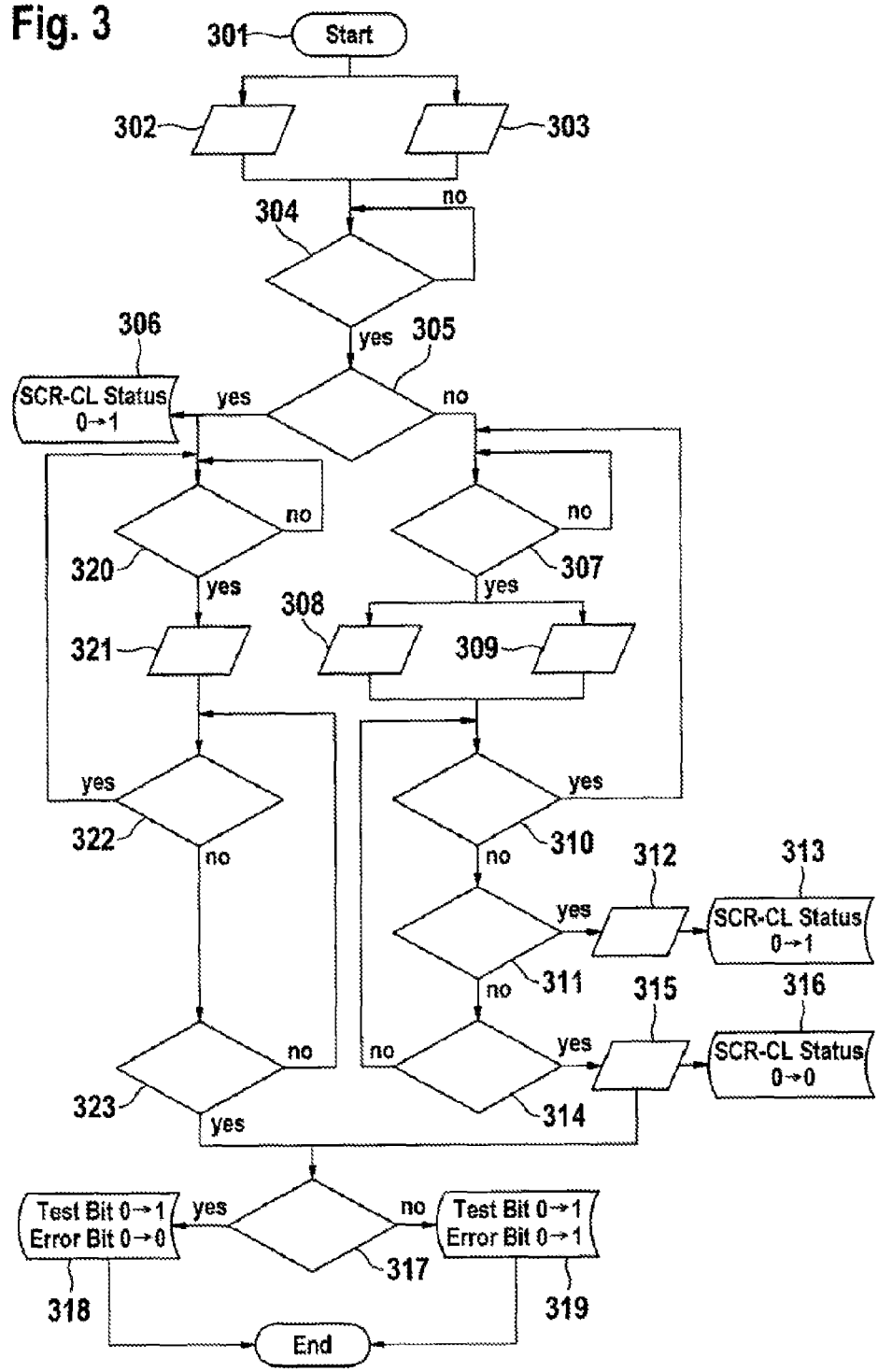

METHOD FOR MONITORING THE ENABLING OF A SYSTEM

BACKGROUND OF THE INVENTION

The present invention relates to a method for monitoring the enabling of a system which is assigned to an internal combustion engine, in which the readiness for operation of the system is dependent on an operating temperature.

In order to reduce nitrogen oxides in the exhaust gas of an internal combustion engine, use is already being made of so-called SCR catalytic converters (Selective Catalytic Reduction) in the exhaust section of the internal combustion engine to reduce the nitrogen oxides contained in the exhaust gas to nitrogen in the presence of a reducing agent. Ammonia is required for the reaction to take place, and this is added to the exhaust gas. In general, an aqueous urea solution is used for this purpose, being injected into the exhaust line upstream of the SCR catalytic converter with the aid of a metering device. Ammonia is formed from this solution and acts as a reducing agent.

For optimum aftertreatment of the exhaust gas, the reducing agent is injected into the exhaust line as required. The metered quantity is calculated in accordance with NOx emissions upstream of the SCR catalytic converter. This calculation includes the reducing agent pressure, which is adjusted to a predeterminable desired pressure.

Since the metering system for the SCR catalytic converter is a component of significance for the exhaust gas, it is necessary to monitor the ability to function of the metering system. The current practice is to monitor the time up to the closing of the control loop (Time To Closed Loop—TTCL) of the SCR metering system or to the enabling of this system on the basis of an evaluation of the temperature of the SCR catalytic converter and the readiness for metering of the SCR system. During this process, a check is made to determine whether the temperature of the SCR catalytic converter is above an applicable threshold and whether the SCR system is ready for metering. If both conditions are satisfied and metering is not active after the expiry of an applicable time, a fault is set. The temperature of the SCR catalytic converter is calculated on the basis of a signal from a temperature sensor arranged upstream of the SCR catalytic converter. The signal from this temperature sensor is generally denoted by T6. In order to ensure that the information provided by the TTCL monitoring is reliable, it is necessary to monitor the functioning of the temperature sensor or the signal T6 from said sensor. Normally, the plausibility of T6 is checked by comparison with a model temperature, which is, in turn, calculated from the signal from another temperature sensor fitted in the exhaust system upstream of the temperature sensor mentioned. The signal from this further temperature sensor in the exhaust system is generally denoted by T5.

Since temperature sensors are generally subject to tolerances, it is not possible to rule out a certain inaccuracy in the plausibility checking and monitoring. It is therefore the underlying object of the invention to provide improved monitoring of the enabling of a system assigned to the internal combustion engine, in particular for the operation of an SCR metering system.

SUMMARY OF THE INVENTION

In the method according to the invention for enabling a system which is assigned to an internal combustion engine and the readiness for operation of which is dependent on an operating temperature, it is the case according to the invention that a fault in the enabling of the system is inferred if operation of the system cannot be detected on expiry of a predeterminable time period after the starting of the internal combustion engine. If there is an interruption in readiness for operation during the current cycle of the internal combustion engine, the invention envisages that a check is made to determine whether operation of the system can be detected after the expiry of a predeterminable time period from the discontinuation and recurrence of readiness for operation. Here, therefore, the starting of the internal combustion engine can be said to be equivalent to the recovery of readiness for operation after a discontinuation of readiness for operation. At the heart of the invention is that it is the absolute time, i.e. the total time expired, between the starting of the internal combustion engine or recurrence of readiness for operation and the beginning of operation of the component which is used as the diagnostic criterion in this approach to monitoring. Unlike known TTCL monitoring methods, evaluation is not based on a relative time from the exceeding of a temperature threshold, which relies on signals from a temperature sensor, e.g. T6. The method according to the invention is independent of temperature sensors fitted in the exhaust line and therefore the inaccuracies associated with temperature sensors are not relevant in the method according to the invention. The method according to the invention thus meets the requirements made, for example, by authorities more effectively than a conventional monitoring method.

The expression "system" in the way it is used here is to be taken to mean systems or partial systems which are assigned to the internal combustion engine. These can be hardware components or software functions, for example.

In a preferred embodiment of the method according to the invention, the predeterminable time period, after the expiry of which a fault is inferred, if appropriate, is determined by means of a first time model. The speed of the internal combustion engine and/or the fuel injection quantity are preferably included in the first time model. In particular, the first time model uses the engine speed and injection quantity as a basis for calculating the predeterminable time period, with the possibility of incorporating corrections by way of further factors, such as the RHU status (Rapid Heat Up), the temperature, e.g. the outside temperature, and/or the vehicle speed. RHU refers to an operating mode used especially in SCR systems with the aim of reaching the exhaust gas temperature required by the components of the exhaust gas aftertreatment system as quickly as possible. However, the use of RHU may not be appropriate under certain circumstances (e.g. warm starting, frozen reducing agent etc.). Since RHU has a major effect on the exhaust gas temperature and hence on the time to the beginning of metering, the time model is preferably corrected accordingly to enable these circumstances too to be covered by means of the monitoring according to the invention. In this case, the model can calculate a threshold value (tStart) for the time from the starting of the engine. If the engine running time reaches or exceeds the threshold value tStart calculated from the time model, an assessment is made to determine whether operation of the system, e.g. the enabling of metering by an SCR metering system, can be detected. This can be ascertained, in particular, from whether a closed control loop (Closed Loop—CL) has been achieved. If CL has not been achieved, a fault is set.

In a particularly preferred embodiment of the method according to the invention, measures for increasing the operating temperature are initiated if operation of the system is not detected on expiry of said first predeterminable time period. After the expiry of a second predeterminable time period, within which the temperature-increasing measures are carried out, a check is made to determine whether operation of the system can be detected. If operation of the system cannot be detected after the expiry of the second predeterminable time period either, the fault is set. This initiation of at least one measure for increasing the operating temperature on suspicion of a fault, which is referred to as escalation, increases the reliability and robustness of the diagnostic method according to the invention. However, if a robust application is possible even without the escalation, escalation measures can be dispensed with.

The second predeterminable time period is preferably determined by means of a second time model, which calculates a second threshold value (tEnd) for the time on the basis especially of the engine speed and the fuel injection quantity, it being possible for the calculation to include correction factors relating, for example, to the temperature (e.g. measurable or calculable outside temperature) and/or the speed of the motor vehicle. Once the time tEnd is reached or exceeded, a check is once again made to determine whether operation or the closed control loop (CL) of the system has been achieved. If CL has not been achieved, a fault is finally set.

The temperature-increasing measures can be suspended or ended if operation (CL) of the system is achieved and/or if the engine running time reaches the threshold value tEnd calculated from the second time model. If the measures for increasing the temperature are suspended in accordance with the operating point, the second time model is reinitialized at the time when the measure(s) is (are) reactivated in order to enable the method according to the invention to be completed.

A so-called ghost counter, i.e. a counter which, in asymmetric diagnoses of this kind, calculates the time that would be required to detect a fault, is preferably implemented in order to carry out the method according to the invention, simplifying the evaluation of the method according to the invention. The ghost counter can be incorporated into the second time model, in particular. To determine the frequency with which diagnoses are run (IUMPR), it is necessary to determine the time required to find a fault. Since, according to the invention, provision can be made for the possibility of detecting a fault only after the expiry of the second time model, but freedom from faults (OK) may already have been detected after the expiry of the first time model, the ghost counter must be used when the system is OK in order to determine the time that would be required to detect a fault. This can be implemented by calculating the second time model without escalation being active if the system is OK.

As an alternative to the use of the time models, it is also possible to use a temperature model for T6. On the assumption that the attainment of a defined exhaust gas temperature is the limiting parameter for the achievement of the closed loop condition, time and temperature modeling are equivalent, given a predetermined driving profile and ambient conditions.

The method according to the invention is suitable for monitoring the enabling of systems, the operation of which is based on a closed control loop. The method according to the invention can furthermore also be employed for monitoring the enabling of adaptive and/or open-loop control systems.

In a preferred embodiment of the method according to the invention, the system which is assigned to the internal combustion engine is the metering system of an SCR catalytic converter. As described at the outset, the hitherto customary SCR-TTCL monitoring was based inter alia on evaluation of the temperature of the SCR catalytic converter, which is determined on the basis of signals (T6) from a temperature sensor arranged upstream of the SCR catalytic converter. The monitoring method according to the invention is independent of temperature sensors in the exhaust line and, as a result, the problems associated with temperature sensors and inaccuracies associated therewith in the monitoring and plausibility checking of the SCR metering system do not occur in the method according to the invention. The operation of the SCR metering system which is to be monitored as part of the method according to the invention can be determined by active metering of the metering system. From the active metering it is possible to ascertain whether SCR-CL has been achieved. The expiry of the predeterminable time periods can be determined, in particular, with the aid of a timer which begins to count when the engine is started. If closed-loop control is suspended during the current driving cycle, i.e. when a loss of the enabled status occurs, the timer begins to count upon recurrence of the enabled status, i.e. after the suspension of the enabled status. This case can occur, for example, when the temperature of the SCR catalytic converter falls during the driving cycle owing to the driving profile, e.g. overrun operation [Krfl], to such an extent that the temperature required for SCR metering is no longer available.

In other embodiments of the method according to the invention, the system is a fuel mass observer (FMO) or an exhaust gas sensor, e.g. a lambda probe, an NOx sensor or a PM sensor. The fuel mass observer is a type of lambda closed-loop controller, the aim of which is to compensate for a drift in the injection and air system. Enabling of the lambda probe is required for closed-loop operation.

The invention furthermore comprises a computer program which carries out all the steps of the method according to the invention when it is carried out on a computing device or a control unit. Finally, the invention comprises a computer program product having a program code, which is stored on a machine-readable medium, for carrying out the method described when the program is carried out on a computing device or a control unit. Implementing the method according to the invention as a computer program or computer program product has the advantage that, by installing the computer program in the control unit of an internal combustion engine, for example, or in some other control unit on the motor vehicle, the advantages of the method according to the invention can be readily employed during the operation of the internal combustion engine without the need to install additional components. Thus, the method according to the invention can also be used to particular advantage on already existing motor vehicles.

BRIEF DESCRIPTION OF THE DRAWINGS

Further features and advantages of the invention will emerge from the following description of embodiments in conjunction with the drawings. In this context, the individual features can each be implemented singly or in combination.

In the drawings:

FIG. 3 shows another flow chart relating to the execution of another preferred embodiment of the method according to the invention.

DETAILED DESCRIPTION

Figure 1:
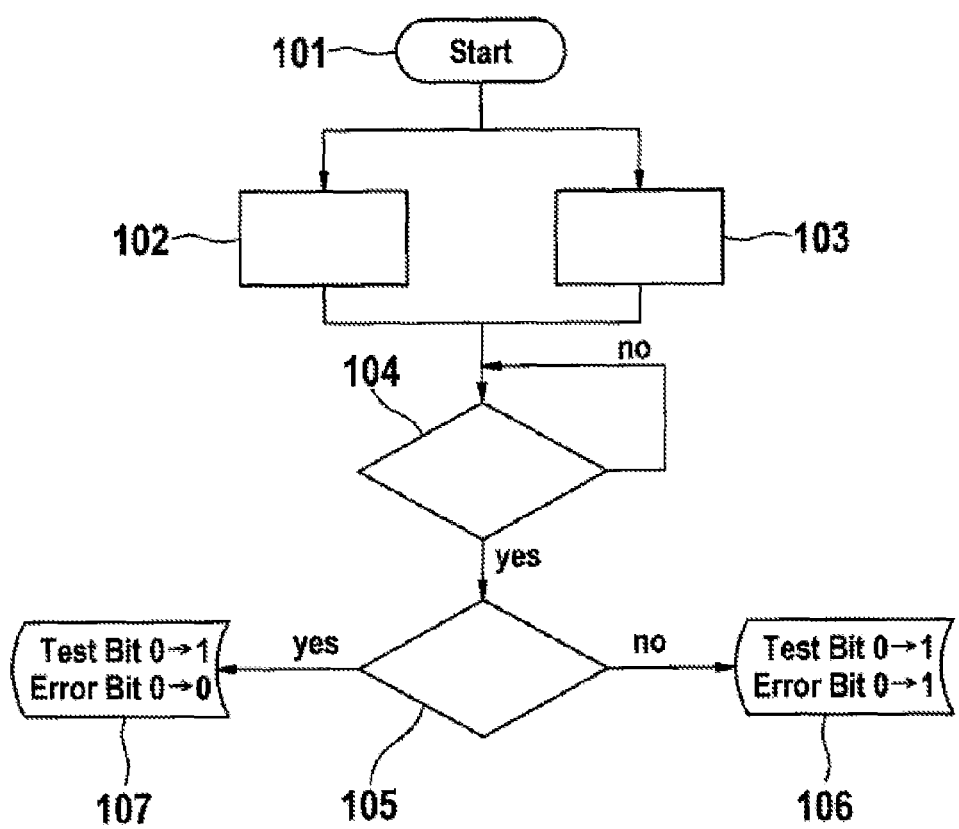
FIG. 1 shows a first flow chart relating to the execution of a preferred embodiment of the method according to the invention.

FIG. 1 shows a flow chart intended to illustrate one embodiment of the method according to the invention. After the starting 101 of the internal combustion engine, the timer is started in step 102 in order to record the time. In parallel with this, in step 103, the first time model relating to the attainment of the threshold value tStart is started. In step 104, a check is made to determine whether the threshold value tStart calculated by means of the first time model has been reached by the engine running time. If this is not the case, the program loops back to the start of step 104. If this is the case, a check is made, in step 105, to determine whether operation of the system can be detected, i.e. whether a closed control loop (CL), for example, of the SCR metering system, for example, can be detected. If operation cannot be detected, a fault is set (error bit 0→1) and a test bit is set to 1 (test bit 0→1) in the output 106. If, in step 105, the program ascertains that operation of the system can be detected, the output given in step 107 is that no fault can be detected (error bit 0→0) and the test bit is likewise set to 1 (test bit 0→1).

Figure 2:
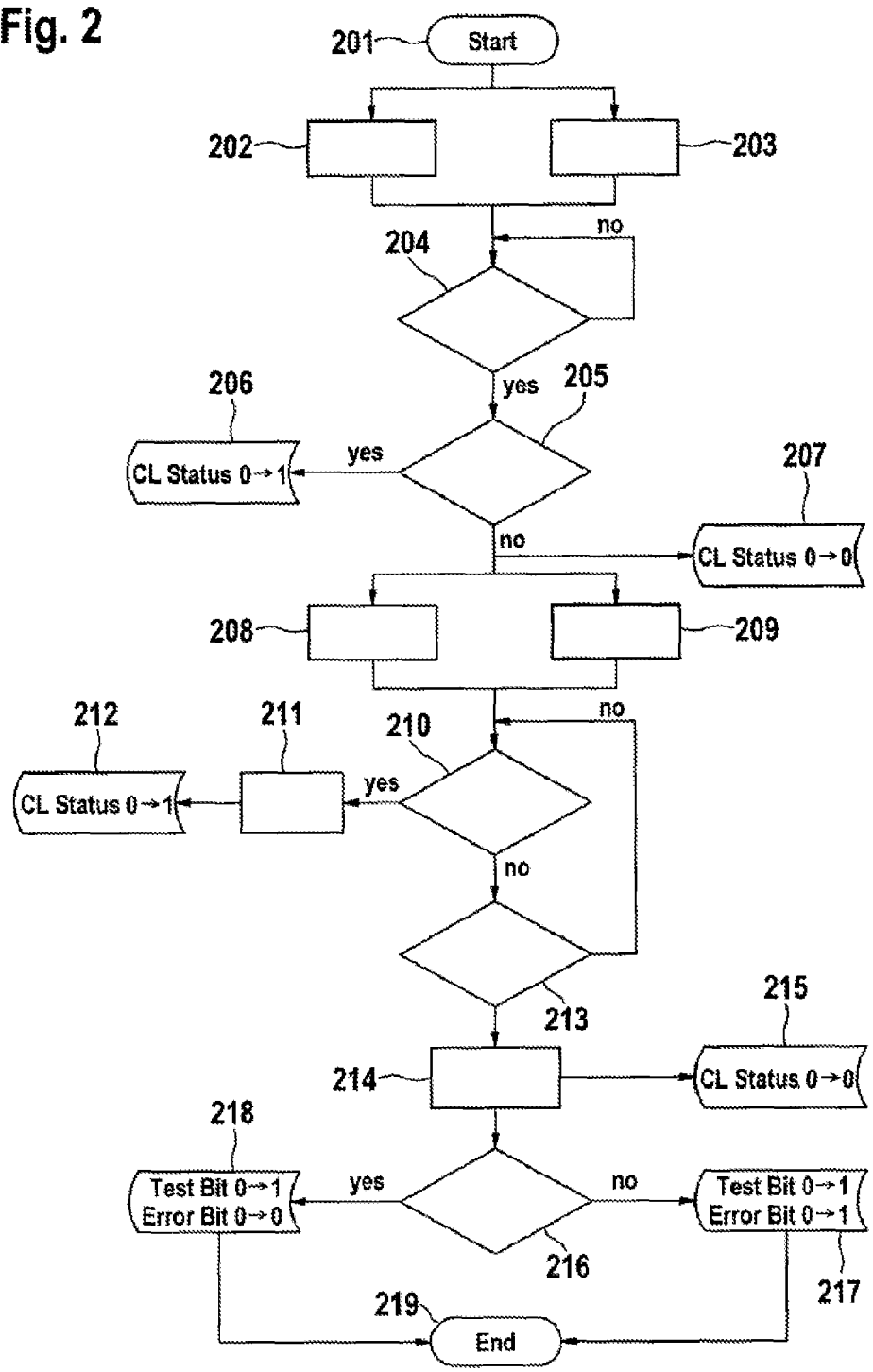
FIG. 2 shows another flow chart relating to the execution of another preferred embodiment of the method according to the invention.

FIG. 2 shows another flow chart intended to illustrate the method according to the invention and, in this embodiment of the method, an escalation, i.e. at least one measure for increasing the operating temperature, is initiated on suspicion of a fault, and a fault is set only if operation of the system cannot be detected even after the temperature-increasing measures. After the starting of the internal combustion engine in step 201, the timer is first of all started in step 202. In parallel with this, the first time model is started in step 203 in order to calculate the threshold value tStart. In step 204, a check is made to determine whether the threshold value tStart calculated by means of the first time model has been reached by the engine running time. If this is not the case, the program loops back to the start of step 204. If the inquiry in step 204 obtains an affirmative answer, a check is made in step 205 to determine whether operation of the system can be detected, e.g. whether a closed control loop (CL) of an SCR metering system has been achieved. If this is the case, the output from step 206 is that operation is detectable, that is to say, for example, that CL has been achieved (CL status 0→1). If, in step 205, the program determines that operation cannot be detected, a corresponding output is issued in step 207 (CL status 0→0). In this case, the temperature-increasing measures are started in step 208. At the same time, the second time model for calculating the threshold value tEnd and, in parallel, a timer are started (step 209). In step 210, the program inquires whether operation can be detected or, in the case of the SCR metering system as an example, whether CL has been achieved. If this is the case, escalation is ended in step 211, and the output from step 212 is that CL has been achieved (CL status 0→1). If the check in step 210 shows that CL has not been achieved, a check is made in step 213 to determine whether the threshold value tEnd from the second time model has been reached. If this is the case, the output from step 215 is that CL has not been achieved (CL status 0→0). Where appropriate, the escalation measures are ended before this in step 214. In step 216, a check is made to determine whether CL has been achieved. If this is not the case, a fault is set (error bit 0→1) in the output 217, and an indication is given that diagnosis has been carried out (test bit 0→1). If, in step 216, the program detects that CL has been achieved, the output 218 is issued that no fault is present (error bit 0→0) and that diagnosis has been run (test bit 0→1). On the basis of the output 217 or 218, diagnosis is ended (step 219).

FIG. 3 shows another flow chart intended to illustrate another embodiment of the method according to the invention. In this case, monitoring is carried out in a manner comparable to the method illustrated in FIG. 2 with temperature-increasing measures (escalation) on suspicion of a fault. Furthermore, a so-called ghost counter is used in parallel with the escalation in order, when necessary, to delay diagnosis sufficiently to ensure that the time that would be required to detect a fault expires. In other words, in the OK condition the second time model is calculated without escalation being active. After the starting 301 of the internal combustion engine or motor, the timer for the engine running time is started in step 302. At the same time, the first time model for calculating the threshold value tStart is started in step 303. In step 304, a check is made to determine whether the threshold value tStart calculated by means of the first time model has been reached by the engine running time. If this is not the case, the program loops back to the start of step 304. If the inquiry in step 304 obtains an affirmative answer, a check is made in step 305 to determine whether operation of the system can be detected, that is to say, for example, whether a closed control loop (CL) of the SCR metering system has been achieved. Where the metering system for an SCR catalytic converter is used as an example, CL (SCR-CL) can be ascertained from whether metering has been activated or demanded. If this is the case, the output from step 306 is that the CL status is OK (SCR-CL status 0→1). If this is not the case, a check is made in step 307 to determine whether the operating conditions for the initiation of temperature-increasing measures have been satisfied. If this is not the case, the program loops back to the start of step 307. If this is the case, so-called escalation is started in step 308, i.e. at least one measure for increasing the operating temperature, e.g. the temperature of the SCR catalytic converter, is started. Examples of temperature-increasing measures are retardation of the main injection, a late post-injection or throttling. In parallel with this, the second time model for calculating the threshold value tEnd is started (step 309). The calculation of the threshold values tStart and tEnd includes, in particular, the speed of the internal combustion engine and the fuel injection quantity, and corrections relating to the temperature and/or the speed of the motor vehicle driven by the internal combustion engine can be allowed for in a manner known per se. In step 310, the program inquires whether suspension of escalation is required due to operation. If this is the case, the program loops back to the start of step 307. If this is not the case, a check is made in step 311 to determine whether operation of the system can be detected, e.g. whether a closed control loop CL, SCR-CL for example, has been achieved. If this is the case, escalation is ended in step 312, i.e. the temperature-increasing measures are stopped. The output from step 313 is then that the CL status is OK (SCR-CL status 0→1). If operation, in particular a closed control loop (CL), cannot be detected in step 311, a check is made in step 314 to determine whether the threshold value tEnd determined by means of the second time model in step 309 has been reached. This inquiry is also made after escalation is stopped in step 312. If this is the case, the temperature-increasing measures are, if appropriate, ended in step 315, and the output in step 316 is that the CL status is not OK (SCR-CL status 0→0). Following on from step 315, another inquiry is made in step 317 to determine whether the CL status is OK, i.e. whether operation of the system can be detected. If this is the case, the output in step 318 is that the monitoring method has been carried out (test bit 0→1) and no fault is present (error bit 0→0). If the inquiry 317 shows that the CL status is not present, a fault is output in step 319 (error bit 0→1) on completion of diagnosis (test bit 0→1). If the inquiry in step 314 shows that the threshold value tEnd has not been reached, the program loops back to the start of step 310.

If, in step 305, the program ascertains that operation of the system can be detected (SCR-CL status 0→1), diagnosis is delayed to such an extent, by implementing the so-called ghost counter, that the time required to run through the diagnosis of an OK system corresponds to that of a faulty system. For this purpose, a check is made in step 320 to determine whether the operating conditions for temperature-increasing measures have been satisfied. If this is not the case, the program loops back to the start of step 320. If this is the case, the second time model is started in step 321. A check is then made in step 322 to determine whether suspension of the temperature-increasing measures has taken place due to operation. If the inquiry in step 322 shows that suspension of the temperature-increasing measures has taken place due to operation, the program loops back to the start of step 320. If the inquiry 322 shows that suspension of escalation due to operation has not taken place, a check is made in step 323 to determine whether the threshold value tEnd from the second time model has been reached. If this is not the case, the program loops back to the start of step 322. If this is the case, step 317 is carried out and the program inquires whether the CL status is OK, i.e. whether operation of the system can be detected. If this is the case, the output 318 is that there is no fault after the monitoring method has been completed. If this is not the case, the output 319 is that the CL status is not OK, and a fault is set.

The ghost counter (steps 320 to 323) compensates for the time difference between an OK system and a defective system during the execution of diagnosis, thus allowing a reliable numerator to be incremented in order to enable diagnosis execution frequency to be determined.

The invention claimed is:

1. A method for monitoring a system of an internal combustion engine,
the method comprising steps of:
monitoring, by a computing device, enabling of the system;
detecting, by the computing device, operation of the system; and
determining, by the computing device, a fault in the enabling of the system if a first predetermined time period after a starting of the internal combustion engine expires before operation of the system is detected,
wherein a readiness for operation of the system is dependent on an operating temperature.

2. The method according to claim 1, wherein the first predetermined time period is determined by means of a first time model.

3. The method according to claim 2, wherein the first time model comprises at least one selected from a group including a speed of the internal combustion engine and a fuel injection quantity.

4. The method according to claim 1, wherein at least one measure for increasing the operating temperature is initiated on expiry of the first predetermined time period as a second predetermined time period without detectable operation of the system, and a fault in the enabling of the system is inferred if operation of the system cannot be detected on expiry of a third predetermined time period from the expiry of the second predetermined time period.

5. The method according to claim 4, wherein the third predetermined time period is determined by means of a second time model.

6. The method according to claim 5, wherein the second time model comprises at least one selected from a group including a speed of the internal combustion engine and a fuel injection quantity.

7. The method according to claim 1, wherein a ghost counter is implemented in order to carry out the method.

8. The method according to claim 1, wherein the system is an metering system of an SCR catalytic converter.

9. The method according to one claim 1, wherein the system is a fuel mass observer.

10. The method according to claim 1, wherein the system is an exhaust gas sensor.

11. A non-transitory computer-readable storage medium storing a computer program that when executed on a computer causes the computer to perform steps of:
monitoring enabling of a system assigned to an internal combustion engine;
detecting operation of the system; and
determining a fault in the enabling of the system if a first predetermined time period after a starting of the internal combustion engine expires before operation of the system is detected,
wherein the readiness for operation of the system is dependent on an operating temperature.

* * * * *

UNITED STATES PATENT AND TRADEMARK OFFICE
CERTIFICATE OF CORRECTION

| | | |
|---|---|---|
| PATENT NO. | : 8,924,132 B2 | Page 1 of 1 |
| APPLICATION NO. | : 13/351425 | |
| DATED | : December 30, 2014 | |
| INVENTOR(S) | : Bouvier et al. | |

It is certified that error appears in the above-identified patent and that said Letters Patent is hereby corrected as shown below:

On the title page, please add the following item (30):

"(30)         Foreign Application Priority Data"
"January 25, 2011   (DE) .................... 10 2011 003 106.5".

Signed and Sealed this
Twenty-first Day of April, 2015

Michelle K. Lee
*Director of the United States Patent and Trademark Office*